United States Patent [19]

Hunt et al.

[11] Patent Number: 5,361,259
[45] Date of Patent: Nov. 1, 1994

[54] WIDE AREA NETWORK (WAN)-ARRANGEMENT

[75] Inventors: Steven D. Hunt, Freehold; Edward W. Landis, Holmdel, both of N.J.

[73] Assignee: American Telephone and Telegraph Company, New York, N.Y.

[21] Appl. No.: 19,974

[22] Filed: Feb. 19, 1993

[51] Int. Cl.⁵ .............................................. H04L 12/48
[52] U.S. Cl. ................................. 370/84; 370/85.13; 370/94.3; 370/95.1
[58] Field of Search ........................ 370/58.1, 58.3, 60, 370/61, 68.1, 84, 85.7, 85.13, 94.3, 95.1, 112, 85.14; 375/38

[56] References Cited

U.S. PATENT DOCUMENTS

| | | | |
|---|---|---|---|
| 4,577,312 | 3/1986 | Nash | 370/84 |
| 4,885,738 | 12/1989 | Bowers et al. | 370/68 |
| 4,922,503 | 5/1990 | Leone | 370/85.13 |
| 4,991,172 | 2/1991 | Cidon et al. | 370/60 |
| 5,065,396 | 11/1991 | Castellano et al. | 370/112 |
| 5,088,090 | 2/1992 | Yacoby et al. | 370/85.13 |
| 5,144,622 | 9/1992 | Takiyasu et al. | 370/85.13 |
| 5,150,360 | 9/1992 | Perlman et al. | 370/94.3 |

OTHER PUBLICATIONS

"Multiband Bandwidth-on-Demand Controllers" marketing brochure published by Ascend Communications, Inc. 1991, Alameda, Calif.

Primary Examiner—Benedict V. Safourek

[57] ABSTRACT

A WAN is formed using Frame Relay Protocol and a telephone network interface unit. An originating LAN sends a message to a router which communicates with a telephone network interface unit using Frame Relay Protocol. The telephone network interface unit determines the destination of a packet received from the router by interpreting the Frame Relay Protocol, and it associates a phone number with that destination. The interface unit uses the phone number to establish at least one DSO connection over a digital telephone network to a destination network interface. A destination network interface unit receives the packet from the digital telephone network and provides the packet to a router which interfaces to the destination LAN. The network interface units add or drop additional DSO channels as required by the traffic load and thereby provide variable bandwidth.

23 Claims, 5 Drawing Sheets

WIDE AREA NETWORK (WAN)-ARRANGEMENT

TECHNICAL FIELD

1. Background of the Invention

The present invention relates to communications, and more particularly, it relates to wide area networks.

2. Description of the Prior Art

Wide area networks CWANs) often comprise local area networks (LANs) that are connected using routers, brouters or bridges. U.S. Pat. No. 5,088,090 entitled "Routing System to Interconnect Local Area Networks" describes a system that connects LANs. FIG. 1 illustrates a system where LAN 10 with data terminals 12 is connected to LAN 20 with data terminals 22 via bridge or router 24. Routers, brouters and bridges are well known in the art and are commercially available from many vendors. Routers and bridges differ in that routers operate at the network layer level of the International Standards Organization (ISO) Open Systems Interconnection (OSI) reference model, and bridges operate at the data link layer of the OSI reference model. Brouters are devices capable of operating at the network layer level or the data link layer level.

As it became desirable to connect more and more geographically dispersed LANs, WAN topologies developed. FIG. 2 illustrates a hub topology. LANs 30, 32, 34 and 36 comprise terminals 38, 40, 42 and 44, respectively. Each LAN is remotely located and is connected to the center of the hub via a two-port router 46 and telephone network 47. Since routers 46 only contain two ports, they are relatively inexpensive pieces of equipment. The center of the hub comprises large router 48. Router 48 has many ports and passes packets of information from a router in a source spoke to a router in a destination spoke. This type of a topology has the disadvantage of using a large router with many ports; routers with a large number of ports are relatively expensive. Additionally, a failure of router 48 will disable the entire WAN.

FIG. 3 illustrates another prior art WAN. This arrangement uses a digital telephone network, such as a switch 56 network, to connect several LANs. This WAN connects LANs 60, 62 and 64 using digital telephone network 66. LAN 60 is connected to digital telephone network 66 via router 68 and inverse multiplexer 70. Link 72 connects LAN 60 and router 68, and router ports 74, 76, 78 and 79 connect router 68 to inverse multiplexer 70. Inverse multiplexer 70 is connected to digital telephone network 66 via a T1 facility. Similarly, LAN 62 is connected to digital telephone network 66 through router 80 and inverse multiplexer 82. LAN 62 is connected to router 80 by link 84, and router ports 86, 88, 90 and 92 connect router 80 to inverse multiplexer 82. Inverse multiplexer 82 is also connected to digital telephone network 66 via a T1 facility. LANs 63, 64 and 65 are also connected to digital telephone network 66 via routers, inverse multiplexers and T1 facilities.

Each LAN communicates with its associated router using a local area network protocol such as TCP/IP over 802.3 Ethernet. Using the destination address of an information packet that the router receives from the source LAN, the information packet is transferred to an inverse multiplexer over a router port that has been assigned to the destination LAN. Each router communicates with its associated inverse multiplexer using a protocol such as HDLC (high level data link control). HDLC is a standard specified by the ISO (International Organization for Standardization) The inverse multiplexer associates each of the router ports with one of the destination LANs. For example, router port 74 is associated with LAN 62, router port 76 is associated with LAN 63, router port 78 is associated with LAN 64 and router port 79 is associated with LAN 65. After communications are completed, the connection through network 66 can be broken, allowing the router ports to be assigned to different destination LANs during subsequent communications; however, each router port is still assigned to only one destination LAN at a time. The inverse multiplexer communicates with the destination LAN over digital telephone network 66 using a T1 facility which comprises 24 DSO facilities. Each DSO facility can carry 56 Kbps (Kbits per second) This arrangement provides a variable bandwidth because the inverse multiplexer may use from 1 to 24 DSO facilities to support the communication rate required by one of the router ports. If more than one of router 68's ports are active, the 24 DSO facilities can be shared between the active ports. For example, if port 74 requires 100 Kbps two DSO facilities are used to communicate with network 66. (Two DSO facilities provide a total of 112 Kbps.) If port 74 increases the data rate, more DSO facilities are added, and if port 74 decreases the data rate, DSO lines are subtracted. This provides a variable bandwidth which is changed in minimum increments of 56 Kbps. On the other side of network 66, a T1 facility provides an input to inverse mux 82. Inverse mux 82 and router 80 are connected by router ports 86, 88, 90 and 92. As with router 68, each port of router 80 is assigned to communicating with a particular LAN. For example, the assignments may result in port 86 being associated with LAN 60, port 88 being associated with LAN 63, port 90 being associated with LAN 64 and port 92 being associated with LAN 65. When a device on LAN 60 is communicating with a device on LAN 62, information packets may travel from the source terminal to the destination through router 68, router port 74, inverse multiplexer 70, telephone network 66, inverse multiplexer 82, router port 86, router 80, LAN 62 and finally to the destination terminal. Inverse multiplexers 70 and 82 provide the number of DSO facilities that are necessary to support the data rate between LAN 60 and LAN 62. As mentioned earlier, DSO facilities are added and subtracted as bandwidth requirements change.

The arrangement of FIG. 3 is superior to the arrangement of FIG. 2 in that the FIG. 3 arrangement provides a variable bandwidth between LANs. Unfortunately, the WAN of FIG. 3 assigns a different router port to each destination LAN, and thereby limits the number of LANs that can communicate simultaneously to the number of ports on the routers. Routers with many ports are expensive and drive up the cost of large WANs.

SUMMARY OF THE INVENTION

The present invention provides a wide area network that comprises a plurality of LANs that are connected using two-port routers, telephone network interfaces and a digital telephone network where the routers and their associated telephone network interfaces communicate using a multi-point protocol that permits a single router port to communicate with several LANs. This invention offers the advantage of variable bandwidth while minimizing the cost of large wide area networks by using two port routers as opposed to more expensive multi-port routers. Additionally, increasing the size of the WAN does not require purchasing new router ports for each of the existing routers.

The present invention provides a communication system between LANs. ALAN interface provides a plurality of data packets containing information from a source LAN, where each of the data packets have an address field with an address. A communication network provides a communication path to a destination LAN, and a network interface provides one of a plurality of variable bandwidth channels between the LAN interface and the communication network, based on the address obtained from each of the packets received from the LAN interface.

DETAILED DESCRIPTION

Figure 1:
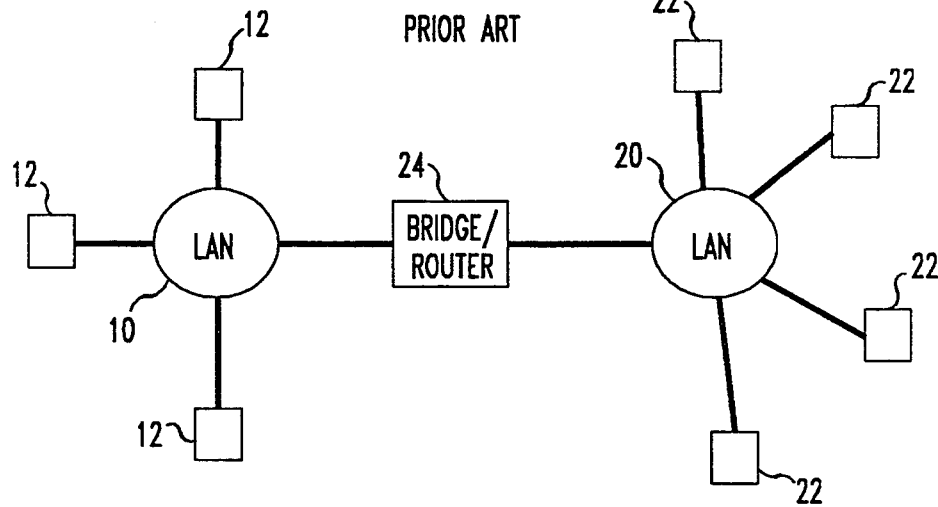
FIG. 1 illustrates two LANs connected by a bridge or router.
Figure 2:
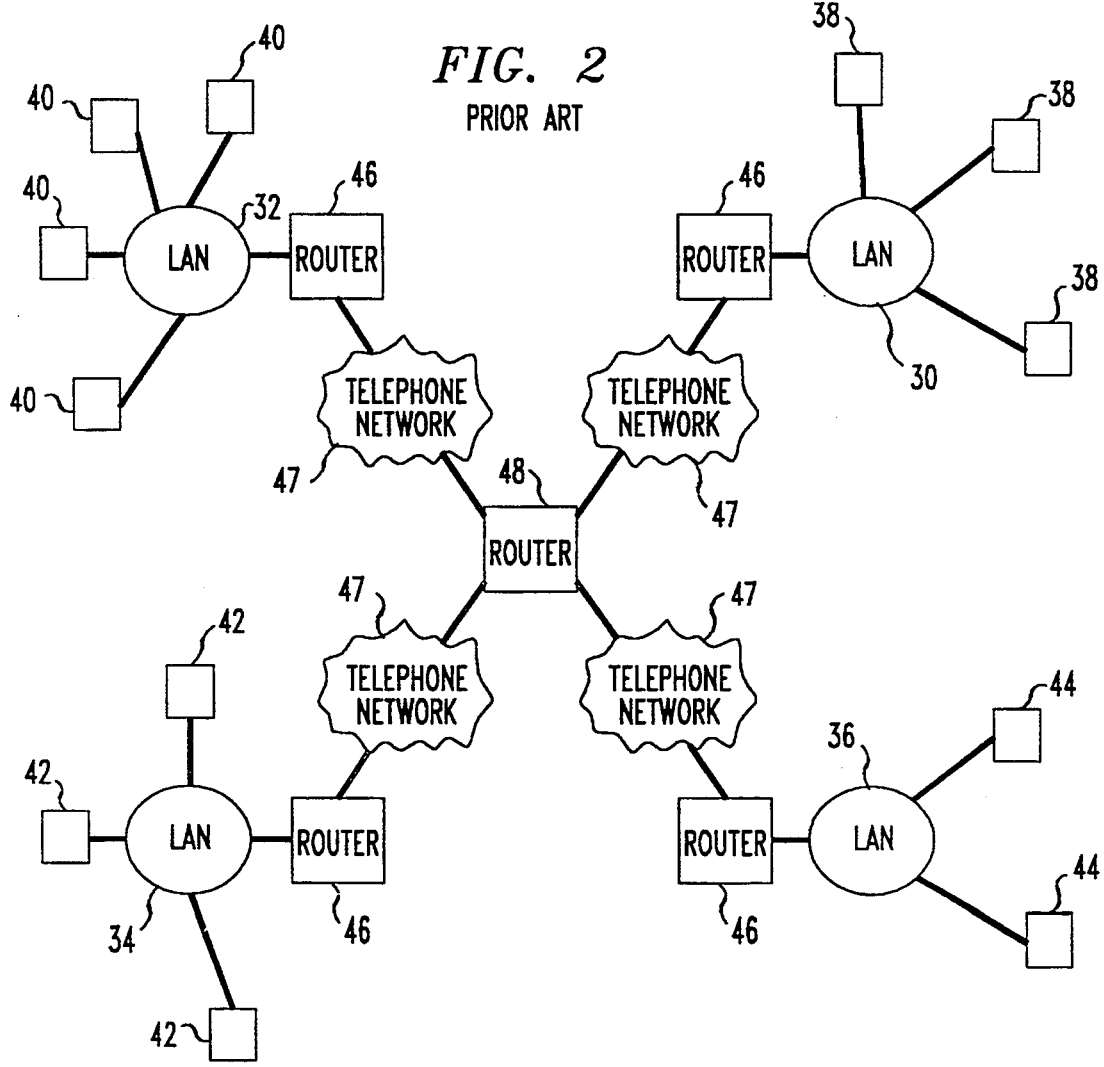
FIG. 2 illustrates a WAN with a hub topology.
Figure 3:
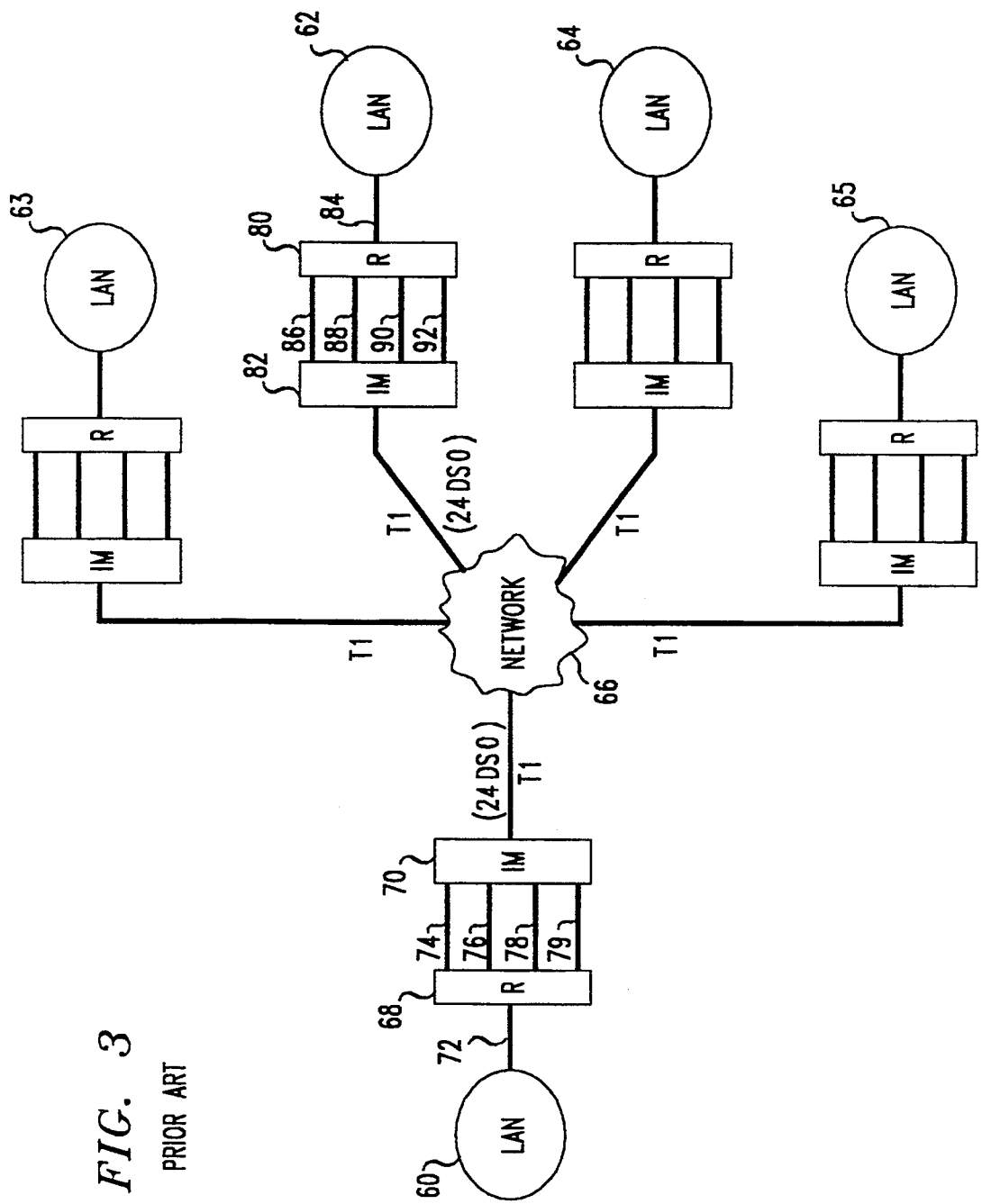
FIG. 3 illustrates a WAN using a digital telephone network and plurality of routers with a large number of ports.
Figure 4:
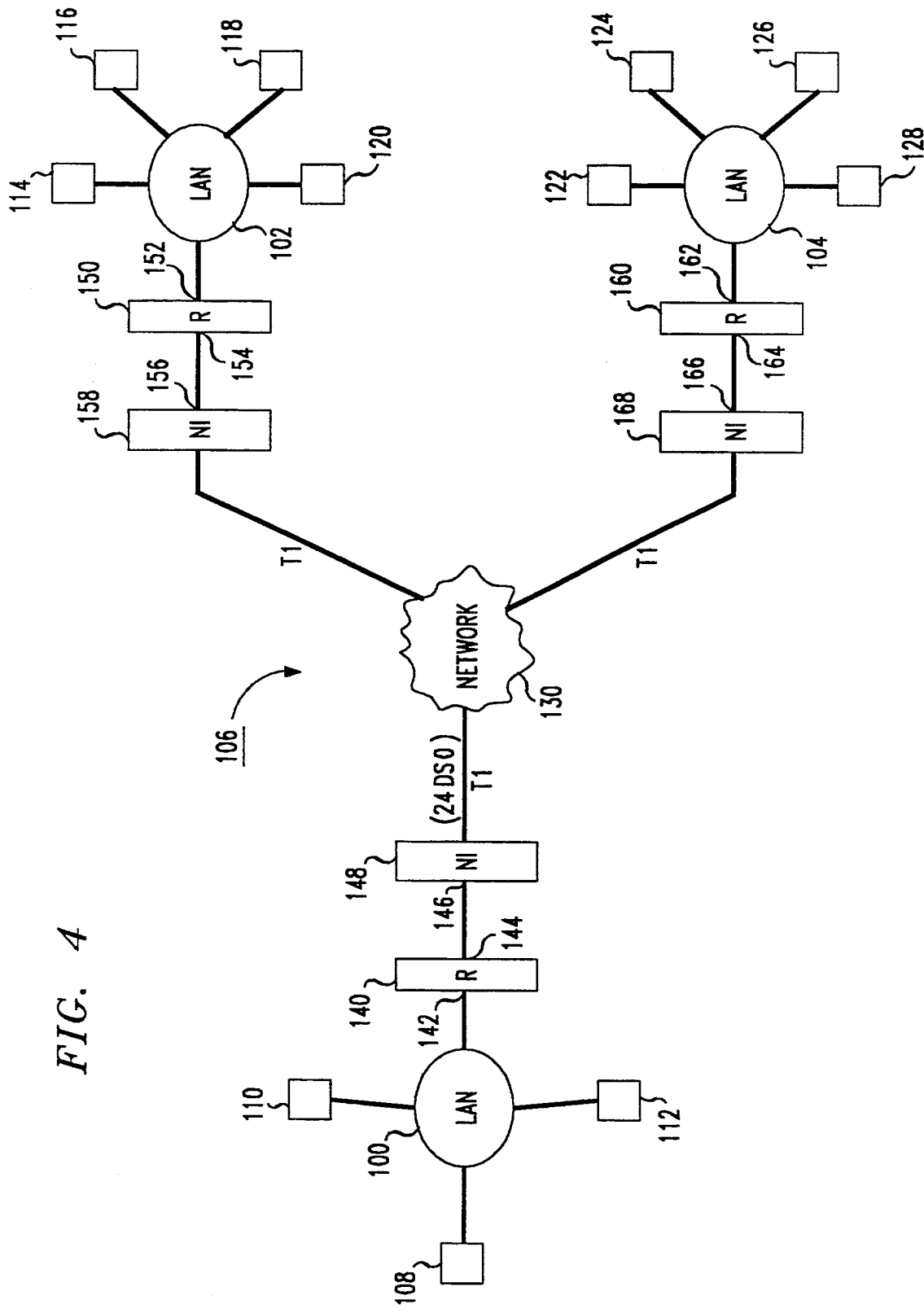
FIG. 4 illustrates a wide area network in accordance with the present invention.

FIG. 4 illustrates a WAN embodying the present invention. LANs 100, 102 and 104 compose wide area network 106. LAN 100 comprises data terminals 108, 110 and 112. LAN 102 comprises data terminals 114, 116, 118 and 120. LAN 104 comprises data terminals 122, 124, 126 and 128. Each LAN is connected to a communications network such as digital telephone network 130, which, for example, may be a switch 56 network or ISDN (Integrated Services Digital Network). Telephone network 130 may be digital or analog in nature. When interfacing to an analog network, a device such as a modem may be used. The LANs are connected to network 130 through a two-port router and a network interface unit. The routers may be replaced with other LAN interface devices such as bridges and brouters. The router and network interface unit communicate using a multi-point protocol. The network interfaces are connected to telephone network 130 via a T1 facility.

LAN 100 is connected to router 140 which comprises ports 142 and 144. It is also possible to use a router that has more than two ports. Port 142 connects LAN 100 to router 140 and port 144 connects router 140 to port 146 of network interface 148. Network interface 148 is connected to network 130 via a facility such as a T1 facility which comprises 24 DS0 facilities. LAN 102 is connected to router 150 which comprises ports 152 and 154. Port 152 is connected to LAN 102, and port 154 is connected to port 156 of network interface 158. Network interface 158 is connected to network 130 via a T1 facility. LAN 104 is connected to router 160 which comprises ports 162 and 164. Port 162 is connected to LAN 104, and port 164 is connected to port 166 of network interface 168. Network interface 168 is connected to network 130 via a T1 facility. Communications between each LAN and its associated router are carried out using the local area protocol for that particular LAN. Communications between each router and its associated network interface are carried out using a multi-point protocol such as frame relay protocol, SMDS (Switched Multi-megabit Data Service), X.25 or other multi-point protocols that have a field which specifies a destination. A detailed description of SMDS is published in "Generic System Requirements in Support of Switched Multi-megabit Data Service," Bellcore Technical Advisory, TA-TSY-00772, Issue 3, October 1989. The X.25 protocol is specified by the International Standards Organization (ISO). The network interfaces communicate over network 130 using information packets in an inverse multiplexing format such as BONDING (Bandwidth on Demand Internetworking Group).

When a source terminal on LAN 100 communicates with a destination terminal on a destination LAN, the source terminal sends data to router 140. Router 140 receives data from LAN 100 at port 142. Router 140 interprets the data to extract a destination address for that information. Router 140 then places the received data into one or more frame relay protocol packets and, for each of the resulting frame relay packets, specifies a data link connection identifier (DLCI) associated with the destination. The frame relay packets are sent out of router 140 via port 144, and are received by port 146 of network interface 148. Ports 144 and 146 may be connected with interfaces, such as V.35, RS232 or RS449 using protocols such as frame relay protocol, X.25 protocol, SMDS and other multi-point protocols. V.35 is specified by the CCITT (International Telegraph and Telephone Consultative Committee), and RS232 and RS449 are Electronic Industry Association Standards. Network interface 148 receives the frame relay packets from router 140 and places the packets in a queue. Network interface 148 associates a DLCI with a phone number, and uses the phone number to establish a DS0 facility connection to a destination network interface that corresponds to the DLCI address associated with the destination LAN containing the destination terminal. Once the DS0 facility connection is established, the messages in the queue are sent to the destination network interface through network 130 using an inverse multiplexing format such as BONDING. Other inverse multiplexing formats may be used, such as a format provided with a commercially available inverse multiplexer. If the data rate of the messages coming into network interface 148 increases beyond what can be carried by a single DS0 facility, network interface 148 establishes additional DS0 connections with the destination network interface. This is continued until sufficient bandwidth is available to carry information between network interface 148 and the destination network interface. If the data rate coming into network interface 148 decreases, unneeded DS0 facilities are dropped between network interface 148 and the destination network interface.

The DS0 facilities are fixed bandwidth communication channels through network 130. The communication channel assigned to one DS0 facility may be different in length or propagation delay than the communication channel assigned to another DS0 facility. As a result, when more than one DS0 facility is used to connect the source and destination network interface, the data may arrive at the destination network interface in a sequence that is different than the sequence that was sent by the source network interface.

When the destination network interface receives the information from network interface 148, it resequences the BONDING formatted packets and then recovers the original frame relay packets from the BONDING formatted packets. Network interface 148 then sends the frame relay packets to the destination router. The destination network interface and destination router are connected via an interface such as V.35 using a multipoint protocol such as a frame relay, SMDS or X.25. The destination router converts the frame relay packets to the local area protocol used by the destination LAN, by extracting and decoding the information field of the frame relay packet to recover the original LAN frame and to identify the destination terminal. The destination router sends the LAN frame out of the router port that connects the router to the destination LAN.

Figure 5:
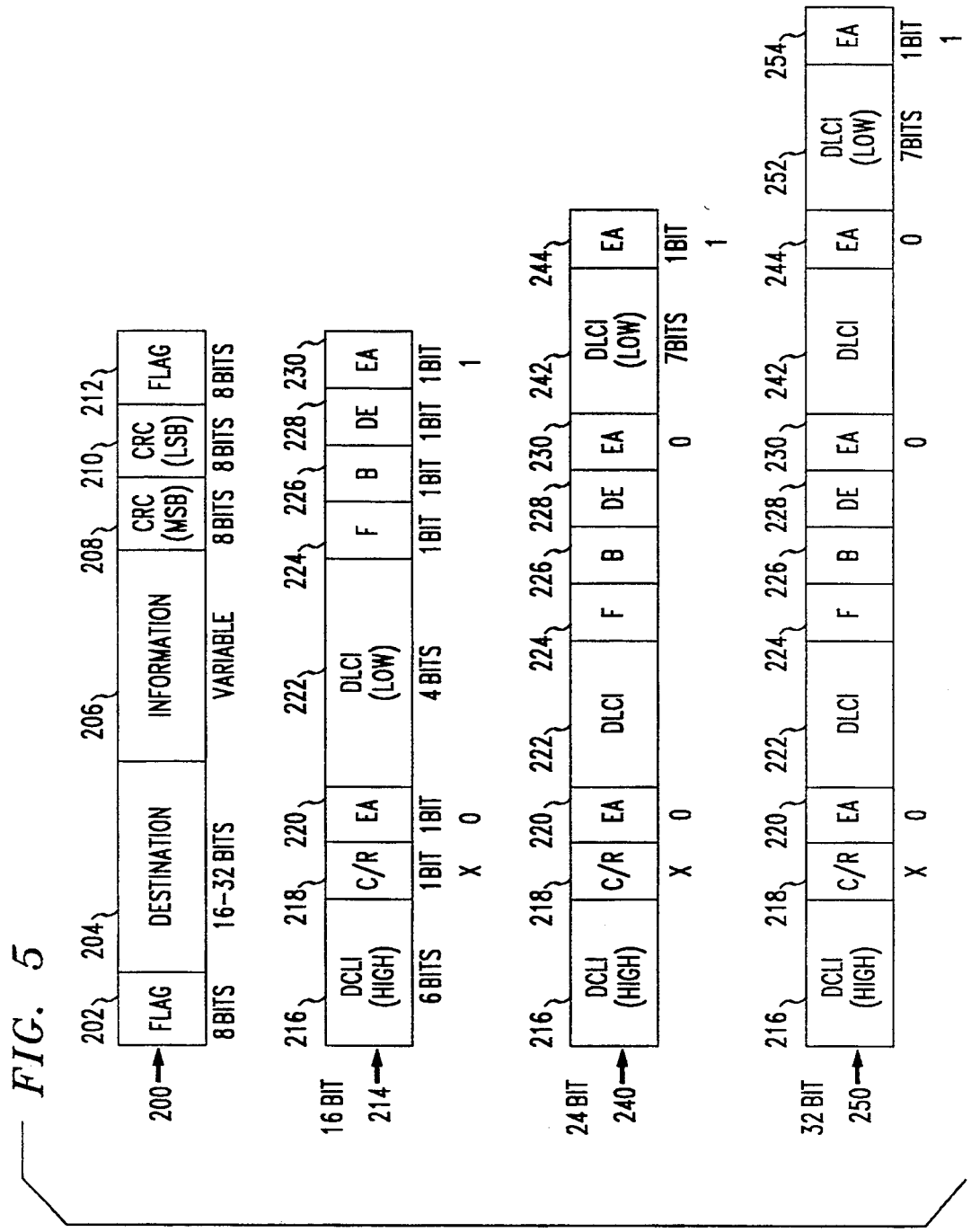
FIG. 5 illustrates a frame relay protocol packet.

By using a multi-point protocol between the routers and their associated network interfaces, it is possible to use a relatively inexpensive two-port router to connect each LAN to the wide area network. As mentioned earlier, protocols such as X.25, SMDS and Frame Relay may be used to connect the routers and network interfaces. FIG. 5 illustrates a frame relay protocol format. Frame relay protocol is well-known in the an and is published by Digital Equipment Corporation, Northern Telecom, Inc. and StrataCom Inc., in "Frame Relay Specifications with Extensions" Rev. 1.0, Sep. 18, 1990. Frame or packet 200 illustrates the basic frame relay format. Segment 202 comprises an eight-bit flag that identifies the beginning of a frame. The destination of a frame or packet is specified by address or destination segment 204 which may comprise 16, 24 or 32 bits. Following destination segment 204 is information segment 206. Information segment 206 is of variable length. Information segment 206 contains information such as the data being transferred between LANs, and higher level OSI (open systems interconnection) reference model information such as network layer logical addresses. Following segment 206 are segments 208 and 210. These segments are 8 bits each and provide a check sum for the packet. When the check sums indicate that an error has occurred, the packet with the error is simply dropped. Segment 212 is an eight-bit flag that signifies the end of the frame relay packet.

Destination segment 204 may comprise 16, 24 or 32 bits. When segment 204 has 16 bits, it is in the form of destination segment 214. Destination segment 214 begins with segment 216 which is 6 bits long and specifies the high order DLCI (data link connection ID) which is used to identify a virtual data link to the destination for the packet. Following segment 216 is segment 218 which is one bit wide and specifies command/response. This bit is not used in the format. The next segment is segment 220 which is an extended address bit that is set to zero when using a 16-bit destination segment. Segment 222 contains the low order four bits of the DLCI. Segments 224 and 226 specify forward explicit congestion notification (FECN) and backward explicit congestion notification (BECN). Segment 228 is a bit that specifies discard eligibility. Segment 228 is set to 1 if the packet is considered eligible to be disregarded by the network when a congestion problem develops. Segment 230 is another extended address bit and is set to 1 when using a 16-bit destination segment.

When destination segment 204 has 24 bits, it is in the form of destination segment 240. The first eight segments are the same as in 16-bit destination segment 214 and are labeled with the same numbers; however in 24-bit destination segment 240, bit 230 is set to 0 and the lowest DLCI bits are in seven-bit segment 242. Segment 244 is a 1-bit extended address bit which is set to 1 for the 24-bit destination segment.

When destination segment 204 has 32 bits, it is in the form of destination segment 250. The first ten segments are the same as in 24 bit destination segment 240 and are labeled with same numbers; however in 32-bit destination segment 250, segment 244 is set to 0 and the lowest order DLCI bits are in seven-bit segment 252. Segment 254 is an extended address bit which is set to 1.

Figure 6:
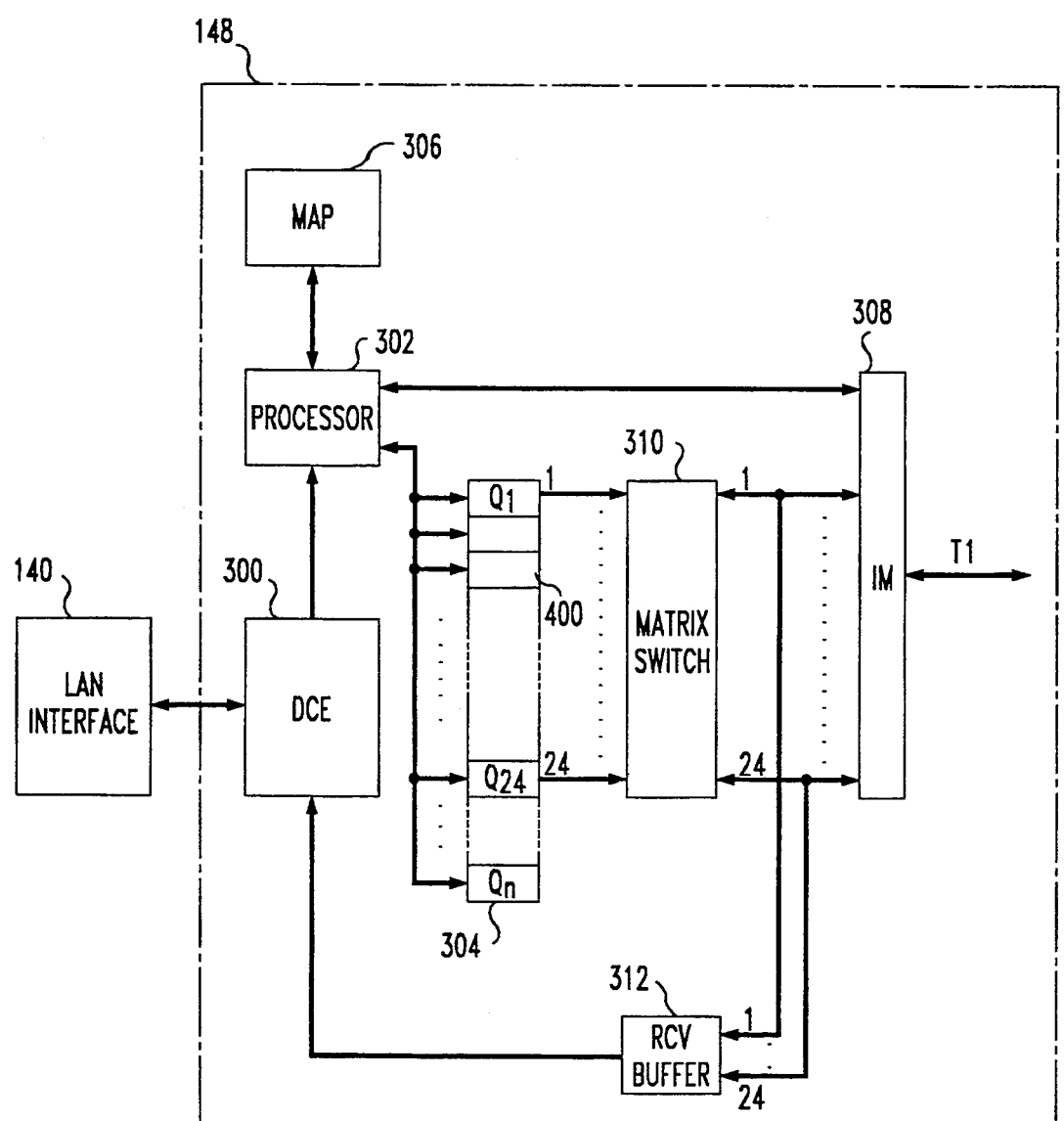
FIG. 6 illustrates a block diagram of a network interface unit that uses a multi-point protocol.

FIG. 6 illustrates a block diagram of network interface 148. Network interface 148 receives its input from LAN interface device or router 140 over V.35 interface using a multi-point protocol such as frame relay protocol. DCE (Data Communications Equipment) interface 300 receives V.35 signals from router 140 and converts them to TFL signals that are received by processor 302. Processor 302 can be any microprocessor, microcomputer or specialized hardware. Processor 302 examines the DLCI specified in destination segment 204 of the frame relay packet received from router 140. Processor 302 then passes the packet to queue storage 304. Queue storage 304 comprises 24 queues where a different queue is used for each of the different DLCIs specified in the incoming packets. More than or less than 24 queues can be included in queue storage 304, however, 24 queues are preferable because the output of network interface 148 only has 24 DS0 facilities or channels. It is possible to provide more or less than 24 DS0 facilities at the output of the network interface 148. Queue storage 304 can be constructed using well-known devices such as RAMs, DRAMs or FIFOS. While processor 302 is storing packets in the appropriate queue based on the packer's DLCI, processor 302 checks map 306. Map 306 is a memory that contains a cross reference between DLCIs and phone numbers. Map 306 can be a RAM, EEROM or ROM. If map 306 is stored in a RAM, it can be programmed via processor 302 by using an RS232 port to processor 302 or by using the DCE interface. If map 306 is stored in the ROM, the ROM can be programmed and then inserted into network interface 148. The phone numbers in map 306 are the numbers dialed to obtain a connection to one of the DS0 facilities to the network interface leading to the destination LAN. In the example of FIG. 4, each destination LAN has a T1 facility connected to its network interface; therefore, each network interface has 24 DS0 lines associated with it. In this situation, each DLCI would have 24 different phone numbers where each phone number corresponds to one of the 24 DS0 facilities connecting to the destination network interface.

As processor 302 stores the frame relay packets in the appropriate queue of queue storage 304, processor 302 obtains a phone number associated with the DLCI of the storm packets. Processor 302 then forwards this phone number to inverse multiplexer 308 so that inverse multiplexer 308 can establish a connection with the inverse multiplexer of the destination network interface. Inverse multiplexer 308 is preferably a 24-channel inverse multiplexer; however, inverse multiplexers with more or less than 24 channels may also be used. Inverse multiplexers are commercially available from companies such as Ascend Communications, Promptus and Telcos. Once inverse multiplexer 308 establishes a DS0 channel with the inverse multiplexer of the destination network interface, inverse multiplexer 308 tells processor 302 which channel of inverse multiplexer 308 is being used to communicate with the inverse multiplexer of the destination network interface. Processor 302 uses this information to associate the queue, which contains the packets that will be sent to the destination network interface with the channel of inverse multiplexer 308 that has a DS0 facility connected to the destination network interface. Processor 302 programs or sets matrix switch 310 so that the appropriate queue in queue storage 304 is connected with the proper channel of inverse multiplexer 308. Matrix switches are well known in the art and may be constructed using simple logic gates and/or software. Once the matrix switch has been configured, the packets flow from the queue through matrix switch 310 to inverse multiplexer 308. Inverse multiplexer 308 formats the frame relay packets into inverse multiplexing formatted packets using a format such as BONDING and connects the packets to the appropriate DS0 facility which is then time-division multiplexed onto the T1 facility leading to the telephone network.

Processor 302 monitors the amount of backlog in a particular queue in queue storage 304, and when that backlog crosses an upper threshold, processor 302 requests an additional DS0 connection between inverse multiplexer 308 and the inverse multiplexer of the destination network interface. This is carried out by referencing map 306 to obtain a second phone number associated with the DLCI of the packets which are in the queue that has crossed the upper threshold. Processor 302 then provides this information to inverse multiplexer 308 which uses the phone number to obtain another DS0 facility to the inverse multiplexer of the destination network interface. Once DS0 facility has been obtained, inverse multiplexer 308 will increase the channel's throughput accordingly. This will allow data to be transmitted at a higher rate and thereby provides a variable bandwidth.

When processor 302 detects that the backlog in a queue crosses an upper threshold, processor 302 requests an additional DS0 facility to the destination inverse multiplexer. Conversely, when processor 302 detects that the amount of backlog in one of the queues crosses a lower threshold, processor 302 instructs inverse multiplexer 308 to drop one of the DS0 facilities to the inverse multiplexer of the destination network interface. This will reduce the inverse multiplexer channel throughput to more closely match the queue's needs.

It is also possible to limit the number of DS0 facilities assigned to a particular queue based on the number of unused DS0 facilities presently available, or based on the total number of DS0 facilities presently assigned to a particular queue. In this way, one queue is prevented from using too much of the overall bandwidth of the T1 facility.

When network interface 148 receives packets from telephone network 130, inverse multiplexer 308 receives the packets in BONDING format and recovers the frame relay packets. In addition, when more than one DS0 facility is used to send the packets to inverse multiplexer 308, inverse multiplexer 308 resequences the BONDING format packets to compensate for the different propagation delays associated with the different DS0 facilities. Inverse multiplexer 308 sends the frame relay packets to elastic receive buffer/multiplexer 312. Elastic buffers and multiplexers are well-known in the an and may be constructed using a device such as a FIFO. Receive buffer 312 sends the frame relay packets to DCE interface 300 which converts the TTL signals from receive buffer 310 to signals specified by the V.35 interface standard. The frame relay packets, which are in the form of V.35 signals, are received by router 140 and eventually forwarded to the destination terminal.

As an example and in reference to FIGS. 4 and 6, the manner in which information travels between terminal 108 and terminal 116 will be examined. Information from terminal 108 is placed in a packet that corresponds to the local area protocol of LAN 100. The LAN packet is received at port 142 of router 140. Router 140 associates a DLCI with the destination of the LAN packet, and inserts the LAN packet into a frame relay packet having a DLCI associated with the destination LAN. Router 140 then transmits the frame relay packet out of port 144 over a V.35 interface to port 146 of network interface 148. Network Interface 148 assigns a queue such as queue 400 to the DLCI in the frame relay packet, and begins storing all frame relay packets with that DLCI in queue 400. Meanwhile, processor 302 obtains a phone number that is associated with the DLCI from map 306, and communicates that number to inverse multiplexer 308. Multiplexer 308 uses the phone number to obtain a DS0 facility to network interface 158. Once the connection is established, inverse multiplexer 308 supplies processor 302 with the channel ID assigned to the inverse multiplexer channel associated with the DS0 facility connected to network interface 158. Processor 302 associates queue 400 with the channel ID supplied by inverse multiplexer 308 and sets matrix switch 310 so that queue 400 is connected to the channel that has been assigned to the new DS0 facility. Once matrix switch 310 has been configured, the packets in queue 400 pass through matrix switch 310 and inverse multiplexer 308 over the T1 facility that is interconnected to network 130. The inverse multiplexer uses BONDING format to send the frame relay packets over network 130. The packet then emerges from network 130 over the T1 facility that is connected to network interface 158. The inverse multiplexer of network interface 158 receives the BONDING packets, resequences the packets if necessary, and recovers the frame relay packet. The frame relay packets from the inverse multiplexer of network interface 158 are sent via a receive buffer/multiplexer and DCE interface of network interface 158 to router 150. Router 150 then decodes the information segment of the frame relay packet and sends it out on LAN 102 destined for terminal 116 using the LAN's protocol.

Congestion on the wide area network is controlled implicitly by high level software at the sending and destination terminals. It is also controlled more explicitly by FECN (forward explicit congestion) and BECN (backward explicit congestion) bits in the frame relay packet. In reference to FIG. 5, these bits correspond to segment 224 and 226, respectively. Segment 224 is set to indicate forward explicit congestion and segment 226 is used to indicate backward explicit congestion. For example, processor 302 of network interface 148 can set the FECN bit on data going to the destination terminal to indicate that no more bandwidth is available to the communications being sent to the destination terminal, and processor 302 of network interface 148 can set the BECN bit on any data being returned to the sending terminal to indicate that transmissions to the destination terminal are now bandwidth limited.

We claim:

1. A communication system between LANs comprising:

LAN interface means for providing a plurality of data packets containing information from a source LAN, each of said data packets having an address field with an address;

a communication network that provides a communication path to a destination LAN; and network interface means for communicating each of said data packets to one of a plurality of variable bandwidth channels between said LAN interface means and said communication network, based on said address obtained from each of said packets received from said LAN interface means.

2. The communication system of claim 1, wherein said variable bandwidth channel comprises a plurality of fixed bandwidth channels.

3. The communication system of claim 2, wherein said network interface means comprises map means for associating said address with a plurality of phone numbers.

4. The communication system of claim 2, wherein said network interface means comprises map means for associating said address with a plurality of phone numbers used to establish said plurality of fixed bandwidth channels.

5. The communication system of claim 1, wherein said network interface means comprises queue means for storing said data packets.

6. The communication system of claim 5, wherein said network interface means comprises means for monitoring a backlog of data packets.

7. The communication system of claim 5, wherein said network interface means comprises means for increasing a bandwidth of said variable bandwidth channel when a backlog of data packets crosses a threshold.

8. The communication system of claim 5, wherein said network interface means comprises means for decreasing a bandwidth of said variable bandwidth channel when a backlog of data packets crosses a threshold.

9. The communication system of claim 1, wherein said communication network is a telephone network.

10. The communication system of claim 9, wherein said communication network is a digital telephone network.

11. The communication system of claim 1, wherein said network interface means comprises an inverse multiplexer.

12. The communication system of claim 11, wherein said network interface means comprises queue means for storing said data packets, and matrix switch means for providing a programmable communication path between said queue means and said inverse multiplexer.

13. The communication system of claim 1, wherein said LAN interface means is a brouter.

14. The communication system of claim 1, wherein said LAN interface means is a router.

15. The communication system of claim 1, wherein said LAN interface means is a bridge.

16. A communication system between LANs comprising:

LAN interface means for providing a plurality of data packets containing information from a source LAN, each of said data packets having an address field with an address;

a telephone network that provides a communication path to a destination LAN; and network interface means for communicating each of said data packets to one of a plurality of variable bandwidth channels between said LAN interface means and said telephone network, based on said address obtained from each of said packets received from said LAN interface means, said variable bandwidth channel comprising a plurality of fixed bandwidth channels, and said network interface means comprising an inverse multiplexer and map means for associating said address with a plurality of phone numbers.

17. The communication system of claim 16, wherein said LAN interface means is a brouter.

18. The communication system of claim 16, wherein said LAN interface means is a router.

19. The communication system of claim 16, wherein said LAN interface means is a bridge.

20. The communication system of claim 16, wherein said plurality of data packets are SMDS packets.

21. The communication system of claim 16, wherein said plurality of data packets are X.25 packets.

22. The communication system of claim 16, wherein said plurality of data packets are frame relay packets.

23. A communication system between LANs comprising:

a router that provides a plurality of frame relay packets containing information from a source LAN, each of said packets having an address field with an address;

a telephone network that provides a communication path to a destination LAN; and network interface means for communicating each of said data packets to one of a plurality of variable bandwidth channels between said router and said telephone network, based on said address obtained from each of said packets received from said router, said variable bandwidth channel comprising a plurality of fixed bandwidth channels, and said network interface means comprising an inverse multiplexer and map means for associating said address with a plurality of phone numbers.

* * * * *

UNITED STATES PATENT AND TRADEMARK OFFICE
CERTIFICATE OF CORRECTION

PATENT NO. : 5,361,259
DATED : November 1, 1994
INVENTOR(S) : Steven D. Hurt, Edward W. Landis It is certified that error appears in the above-indentified patent and that said Letters Patent is hereby corrected as shown below:

```
On the title page, under Primary Examiner, should read --Attorney,
Agent, or Firm-Christopher N. Malvone--.
Column 1, line 9, "CWANs)" should read --(WANs)--.
Column 3, line 5, "ALAN" should read --A LAN--.
Column 3, line 16, "DESCRIPTION OF THE DRAWING" should read
--BRIEF DESCRIPTION OF THE DRAWING--.
Column 5, line 22, in the an and" should read --in the art and--.
Column 6, line 16, "TFL" should read --TTL--.
Column 6, line 33, "packer's" should read --packet's--.
Column 6, line 54, "storm packets" should read --stored packets--.
Column 6, line 63, "Telcos" should read --Teleos--.
Column 7, line 65, "the an" should read --the art--.
```

Signed and Sealed this

Ninth Day of May, 1995

Attest:

BRUCE LEHMAN

*Attesting Officer*          *Commissioner of Patents and Trademarks*